United States Patent
Winkler et al.

(10) Patent No.: US 9,024,466 B2
(45) Date of Patent: May 5, 2015

(54) ON-BOARD ELECTRICAL SYSTEM FOR A MOTOR VEHICLE AND METHOD FOR OPERATING AN ELECTRICAL LOAD

(75) Inventors: Josef Winkler, Kipfenberg (DE); Johannes Pforr, München (DE)

(73) Assignees: Audi AG, Ingolstadt (DE); Hochschule Ingolstadt, Ingolstadt (DE)

( * ) Notice: Subject to any disclaimer, the term of this patent is extended or adjusted under 35 U.S.C. 154(b) by 684 days.

(21) Appl. No.: 13/377,312

(22) PCT Filed: May 22, 2010

(86) PCT No.: PCT/EP2010/003156
§ 371 (c)(1),
(2), (4) Date: Dec. 9, 2011

(87) PCT Pub. No.: WO2010/142373
PCT Pub. Date: Dec. 16, 2010

(65) Prior Publication Data
US 2012/0074775 A1    Mar. 29, 2012

(30) Foreign Application Priority Data
Jun. 9, 2009 (DE) .......................... 10 2009 024 374

(51) Int. Cl.
*B60L 1/00* (2006.01)
*H02J 7/14* (2006.01)
(Continued)

(52) U.S. Cl.
CPC .............. *H02J 7/1438* (2013.01); *B60R 16/03* (2013.01); *H02J 7/345* (2013.01); *Y02T 10/7005* (2013.01); *Y02T 10/7022* (2013.01); *F02N 11/0866* (2013.01)

(58) Field of Classification Search
USPC ............... 307/10.1, 9.1; 290/40 C; 180/65.29
See application file for complete search history.

(56) References Cited

U.S. PATENT DOCUMENTS

| 6,563,235 | B1 | 5/2003 | McIntyre et al. |
| 6,919,648 | B2 | 7/2005 | Bolz et al. |
| 2007/0210781 | A1 | 9/2007 | Leong et al. |

FOREIGN PATENT DOCUMENTS

| DE | 198 59 036 A1 | 6/2000 |
| DE | 102 13 105 A1 | 11/2002 |

(Continued)

OTHER PUBLICATIONS

Continental, ELKS 2008—"Elektrische Leistungsbordnetze und Komponenten von Straßenfahrzeugen", Beiträge zum gleichnamigen ersten Symposium vom 8. und 9. Oktober 2008, TU Braunschweig, ISBN: 978-3-937655-17-8, Seite 90.

(Continued)

*Primary Examiner* — Daniel Cavallari
(74) *Attorney, Agent, or Firm* — Henry M. Feiereisen LLC.

(57) ABSTRACT

Disclosed is a method allowing the advantageous operation of an on-board electrical system (10) of a motor vehicle without high energy expenditure. Provided is an on-board electrical system (10) comprising a vehicle battery (16), an electrical load (30, 48) and a double-layer capacitor (32) with a positive and a negative terminal (34, 36). Switching means (22) are provided that couple the positive terminal (34) with the vehicle battery (16) and the negative terminal (36) with the electrical load (30, 48) in a first switching state, and that have at least one additional switching state. In the first switching state, an overvoltage can be compensated since the double-layer capacitor (32) is connected in series with opposite polarity to the vehicle battery (16). Preferably, the polarity of the double-layer capacitor (32) can be reversed, and the latter can be bridged. The switching means (22) can also assume a switching state in which the electrical load (30, 48) is decoupled from the vehicle battery (16).

13 Claims, 1 Drawing Sheet

(51) Int. Cl.
*B60R 16/03* (2006.01)
*F02N 11/08* (2006.01)
*H02J 7/34* (2006.01)

(56) References Cited

FOREIGN PATENT DOCUMENTS

| DE | 10 2005 015 995 A1 | 10/2006 |
| DE | 10 2005 042 154 A1 | 4/2007 |
| DE | 10 2007 026 164 A1 | 12/2008 |
| DE | 10 2008 002 177 A1 | 12/2009 |
| EP | 1 035 637 A2 | 9/2000 |
| WO | WO 02/066293 A1 | 8/2002 |

OTHER PUBLICATIONS

Robert Bosch GmbH, "Autoelektrik, Autoelektronik, Systeme und Komponenten", 4. Auflage, Vieweg Verlag, Wiesbaden, ISBN 3-528-13872-6, Seite 16, Abbildung 7.

M. Glinka, Member, IEEE; Institute of Power Electronics and Control; Universität der Bundeswehr München, Germany; Prototype of Multiphase Modular-Multilevel-Converter with 2MW power rating and 17- level- output- voltage; 2004 35th Annual IEEE Power Electronics Specialists Conference; Aachen, Germany 2004.

ON-BOARD ELECTRICAL SYSTEM FOR A MOTOR VEHICLE AND METHOD FOR OPERATING AN ELECTRICAL LOAD

CROSS-REFERENCES TO RELATED APPLICATIONS

This application is the U.S. National Stage of International Application No. PCT/EP2010/003156, filed May 22, 2010, which designated the United States and has been published as International Publication No. WO 2010/142373 and which claims the priority of German Patent Application, Serial No. 10 2009 024 374.7, filed Jun. 9, 2009, pursuant to 35 U.S.C. 119(a)-(d).

BACKGROUND OF THE INVENTION

The invention relates to an on-board electrical system for an automobile. The on-board electrical system includes a vehicle battery, an electrical load and an energy store with a positive and a negative terminal. The invention also relates to an automobile with such on-board electrical system and to a method for operating an electrical load in an on-board electrical system of an automobile.

Modern automobiles have progressively more electrical loads consuming high power. Such electrical loads are used to replace mechanical or hydraulic systems in order to achieve lower fuel consumption with improved functionality. In particular, these are electric motors which are used, for example, for the steering system as well as in a braking system (for example the ESP, the "Electronic Stability Program"). The current consumption of these electrical loads is not constant, because they are switched in only when needed. A starter for an internal combustion engine represents such an electrical load, whose current consumption has very strong variations, namely depending on the rotation speed.

In the simplest situation, the on-board electrical system of an automobile includes a vehicle battery, a generator and a plurality of energy loads. When the engine is running, the generator supplies an electrical voltage used to power the loads and to charge the vehicle battery. The power supplied by the generator can also be adapted by a controller to the respective instantaneous current demand of the electrical load. However, the modern electrical loads strain the on-board electrical system with high pulsed currents. Presently used generators are too sluggish to supply these pulsed currents or to quickly increase or decrease the voltage. The on-board electrical system voltage is therefore mainly stabilized by the vehicle battery, and the quality of the on-board electrical system voltage is determined by the internal resistance of the vehicle battery. The on-board electrical system voltage can drop by several volts under the high pulsed currents, so that the functionality of sensitive loads may be temporally impaired. Such behavior is quite problematic, in particular with the novel start/stop systems in automobiles.

Different systems for reducing the voltage drops and for protecting sensitive loads were developed in the past. Most of these systems are based on double-layer capacitors or batteries which are used as additional energy stores in the on-board electrical system. In many conventional systems, the additional energy store is connected in parallel with the vehicle battery; this parallel connection reduces the total impedance so that the voltage drop of the on-board electrical system becomes smaller. Such on-board electrical systems are disclosed, for example, in the published documents DE 10 2005 015 995 A1 and DE 10 2007 026 164 A1.

An additional energy store implemented as a DC converter can also be added, which is described in the published documents WO 02/066293 A1 and DE 198 59 036 A1.

It is also known in the art to supply the sensitive loads directly from the additional energy store and to thereby decouple the load from the high-power loads. Such approach is described, for example, in Robert Bosch GmbH, "Autoelektrik, Autoelektronik, Systeme and Komponenten", 4$^{th}$ edition, Vieweg Verlag, Wiesbaden, ISBN 3-528-13872-6, Page 16, FIG. 7.

According to a new trend, an additional energy store, for example a double-layer capacitor, is connected in series with the vehicle battery. An on-board electrical system of this type is known from the document Continental, ELKS 2008—"Elektrische Leistungsbordnetze und Komponenten von Straßenfahrzeugen", contributions to the first Symposium with the same name held from 8 to 9 Oct. 2008, TU Braunschweig, ISBN: 978-3-937655-17-8, Page 90. In this on-board electrical system, the voltage drop during an engine start is compensated by connecting a double-layer capacitor in series with the vehicle battery. With this series connection, a voltage can be supplied to the load—in an ideal situation where the starter is not operated—which is greater than the battery voltage. This represents an undervoltage compensation. A vehicle battery and a double-layer capacitor which are connected in series are also disclosed in the published document DE 10 2005 042 154 A1.

The overall state-of-the-art is concerned with problems associated with compensating voltage drops in the on-board electrical system. It is a particular challenge to compensate not only the voltage drops, but to also compensate overvoltages in the on-board electrical system without adding substantial complexity and costs, namely without using an expensive DC voltage converter.

It is an object of the invention to provide a solution for reliably operating an electrical load in an on-board electrical system of the aforedescribed type without increasing its complexity.

SUMMARY OF THE INVENTION

The on-board electrical system according to the invention includes a vehicle battery, and electrical load and an energy store with a positive and a negative terminal. According to the invention, switching means are provided which in a first switching state couple the positive terminal of the energy store with the vehicle battery and the negative terminal of the energy store with the electrical load, and which can be switched into at least one additional switching state different from the first switching state. A controller can switch the switching means between the first and the at least one additional switching state.

With the invention, a voltage can therefore be supplied on the electrical load which is lower than the electrical voltage applied on the vehicle battery, regardless if this is a battery voltage or a generator voltage of a generator connected in parallel with the vehicle battery. This lower voltage is achieved by using the additional energy store, for example a double-layer capacitor (also known under the name SuperCap), without using a DC voltage converter as in the state-of-the-art.

The on-board electrical system according to the invention has the advantage that an overvoltage on the electrical load can be compensated—in particular when the generator is coupled in parallel with the battery. Such overvoltage can occur, for example, when an electrical high-power load coupled in parallel with the vehicle battery is switched off. In this case, a voltage is generated in the on-board electrical system which is greater than the voltage produced by the generator in normal operation. When such overvoltage occurs, the generator alone is not capable of compensating this overvoltage fast enough. In this case, the on-board electrical system according to the invention is particularly advantageous because it is capable of compensating this overvoltage, namely by coupling the positive terminal of the energy store with the vehicle battery (optionally also with the generator) and the negative terminal of the energy store with the electrical load. The voltage provided by the energy store is then subtracted from the voltage applied on the vehicle battery because the polarity of the energy store is reversed.

The on-board electrical system according to the invention has the additional advantage that the vehicle battery can be regenerated, namely as follows: a voltage is generated by the generator on the battery, wherein the voltage is significantly higher than the on-board electrical system voltage in normal operation and therefore significantly higher than the nominal voltage of the vehicle battery (for example, 17 V for a nominal voltage of 12 V). This voltage produced by the generator can be reduced for the electrical load by the energy store. By applying a higher voltage on the vehicle battery for a specified time interval, the acid coating of the vehicle battery can be eliminated through gas bubble agitation. This increases the effective capacity of the vehicle battery and decreases its internal resistance. With such regeneration of the vehicle battery, the crystal size of the deposited lead sulfate also changes. During the service life of the vehicle battery, an increasing number of smaller $PbSO_4$ crystals crystallize into larger crystals which are difficult to dissolve. This reduces the active mass of the lead sulfate crystals (sulphation). Application of a higher voltage to the vehicle battery changes the crystal size and/or the crystal structure of the lead sulfate so that it is transformed from an insoluble form into a soluble form, allowing it to again participate in the charging and discharging process. In addition, the effective capacity of the vehicle battery also increases while the internal resistance decreases.

An additional advantage of the on-board electrical system according to the invention should also not go unnoticed: if the electrical load is a starter for an internal combustion engine, then the voltage on the starter can be lowered at the beginning of the starting process by using the energy store. At the beginning of the starting process, the starter—which is a DC motor—only sees a short-circuit. By reducing the voltage at the beginning of the starting process, the currents which are typically very high (approximately 1000 A) can be reduced. With additional prerequisites (see below), the entire starting process can thus be accelerated compared to the state-of-the-art.

According to one embodiment, the switching means may in a second switching state couple the vehicle battery with the electrical load. The energy store is then bridged and the same electrical voltage is applied on the electrical load as on the vehicle battery. The second switching state of the switching means may represent a normal operation of the on-board electrical system, in which the electrical load is directly connected with the vehicle battery—and preferably also with a generator which is connected in parallel with the vehicle battery. For example, if an overvoltage occurs in the on-board electrical system, then the switching means can be switched from the second switching state into the first switching state, thus compensating the overvoltage.

By controlling the switching means, the controller can provide an electrical voltage at the electrical load having an average value in a range from $U_B-U_S$ to $U_B$. $U_B$ indicates here a voltage applied on the vehicle battery—this may be the generator voltage or the battery voltage—and $U_S$ a voltage supplied by the energy store. This may be accomplished, for example, by alternatingly switching the switching means with the controller between the first and the second switching state with a predetermined frequency. An arbitrary average value of the voltage in the aforementioned range can be attained on the electrical load through suitable selection of the ratio of the time during which the energy store is connected between the vehicle battery and the electrical load to the time during which the energy store is bridged. Any overvoltage, regardless if it is a small overvoltage or a high overvoltage, can thereby be compensated. Only the average value must be adjusted accordingly. This may be carried out, for example, with a following process flow: the electrical load is a sensitive load, for example a radio. An electric motor of a steering system—representing a high-power load—and a generator are coupled in parallel with the vehicle battery. The driver of the automobile initially drives on a straight course, so that the electric motor is not operated. During this time, the vehicle battery and the generator connected in parallel with the vehicle battery are directly connected with the radio, i.e., the energy store is bridged. In this normal operation, the controller controls the generator so that the generator supplies an on-board electrical system voltage of, for example, 14.5 V. The driver now steers the vehicle to the left, and the electric motor of the steering system begins to operate. While the electric motor operates, the generator increases the on-board electrical system voltage so that this voltage does not deviate from the value of 14.5 V. When the steering maneuver is concluded, the electric motor is switched off and the on-board electrical system voltage increases, for example, to 17 V. The generator is too slow to rapidly compensate this overvoltage. The controller now switches the switching means alternatingly between the first and second switching state such that the on-board electrical system voltage is again reduced by the energy store to 14.5 V. The switching means are thus alternatingly switched between the first and the second switching state such that the energy store—which is capable of providing, for example, a maximum voltage of 5 V, provides a voltage with an average value of −2.5 V. This approach ensures that the on-board electrical system voltage is adjusted to 14.5 V even after the drive motor is switched off.

It may be provided that in a third switching state the switching means couple the positive terminal of the energy store with the electrical load and the negative terminal of the energy store with the vehicle battery. In this case, a voltage on the electrical load can be greater than the voltage applied on the vehicle battery. This embodiment is used to compensate voltage drops—which may occur in the on-board electrical system when a high-power load is added. In particular, when a generator is connected in parallel with the vehicle battery, an undervoltage can be quickly compensated by switching the switching means into the third switching state. A generator is too sluggish to rapidly compensate voltage drops caused by high-power loads. Sensitive loads typically turn off when the on-board electrical system voltage drops below 10.8 V. A particular advantage of this embodiment is hence that sensitive loads can be prevented from switching off when a voltage drop occurs. In this embodiment, the switching means can thus be switched at least between the first switching state, where the positive terminal of the energy store is coupled with the vehicle battery, and the third switching stage, where the polarity of the energy store is reversed. With this combination, both an overvoltage and an undervoltage in the on-board electrical system can be compensated. When the second switching state is added where the energy store is bridged, the voltage on the electrical load can be adjusted to any value in a range from $U_B-U_S$ to $U_B+U_S$.

The third switching state of the switching means can also be used in conjunction with the first switching state for pre-heating the energy store to a specified temperature when the on-board electrical system is started up and/or when the on-board electrical system transitions from one operating state into another operating state. For example, the switching means may be alternatingly switched during a pre-heat phase of the energy store and/or during a transition from one operating state into another operating state between the first and the third switching state. The energy store is then charged and discharged again several times, until it is heated to a specified operating temperature.

By controlling the switching means, the controller can supply an electrical voltage with an average value in a range from $U_B$ to $U_B+U_S$ to the electrical load. This can be achieved, for example, by switching the switching means with the controller alternatingly between the third switching state, in which the positive terminal of the energy store is coupled with the load, and the second switching state, in which the energy store is bridged.

In this way, any voltage drop in the on-board electrical system can be compensated by correspondingly switching the switching means, for example in a following manner: the driver drives with the automobile on a straight course. During this time, an electric motor of a braking system—which is coupled in parallel with the vehicle battery—is switched off. The controller controls the voltage of the on-board electrical system generated by the generator to 14.5 V. The driver now operates the brake of the automobile. The drive motor in the braking system is activated and the voltage of the on-board electrical system drops at the beginning of this maneuver, for example to 12 V. Because the generator is too slow to rapidly compensate this voltage drop, the controller switches the switching means alternatingly between the second and the third switching state, so that the voltage of the on-board electrical system is again adjusted to 14.5 V. The voltage of the energy store—for example 5V—is periodically added to the generator voltage of 12 V, so that a voltage at the electrical load with an average value of 14.5 can be provided by correspondingly switching the switching means. The operation of sensitive loads is then not adversely affected.

A fourth switching state of a switching means may also be provided in which the switching means disconnect the electrical load from the vehicle battery. This provides a protection against reverse polarity for the electrical load: if a foreign battery with a wrong polarity is connected to the vehicle battery—to start another automobile—, then the circuit to the electrical load is interrupted by the switching means, thereby protecting the electrical load from a wrong polarity. This embodiment has proven to be particularly advantageous even when several electrical loads, which are to be disconnected from the vehicle battery with a single relay, are arranged in the on-board electrical system. The switching means then need only to be switched in the fourth switching state, without requiring that the electrical loads are separately disconnected from the vehicle battery.

It has proven to be particularly advantageous to couple a low-pass filter with the switching means. Such filter may include a coil connected in series with the switching means, as well as a capacitor connected in parallel with the series connection of the switching means and the coil. A smoothed voltage, i.e. a DC voltage, can then be provided to the electrical load. The amplitude of this DC voltage then corresponds to the average value of the sum of the voltage applied on the battery and the voltage supplied by the energy store.

Fundamentally, two alternatives for the on-board electrical system are feasible:

On one hand, a generator may be connected in parallel with the vehicle battery. The parallel connection of the vehicle battery and the generator can then be coupled via the switching means with the electrical load. Through corresponding control of the switching means, the voltage at the electrical load can then stabilized when a high-power load is connected or disconnected in parallel with the generator. Or the other hand, the electrical load itself may be a high-power load—for example a starter for an internal combustion engine. This high-power load can then be controlled with a variable voltage.

When a generator for generating a generator voltage is coupled in parallel with the vehicle battery, the controller may control the switching means depending on the respective instantaneous value of the generator voltage. The controller may control, for example, the voltage applied on the electrical load to a desired value, namely by a corresponding control of the switching means. When the generator voltage drops, the controller can compensate this voltage drop by a switching in the energy store. If an overvoltage is present at the generator, then this overvoltage can also be compensated by correspondingly controlling the switching means—as described above.

In one embodiment—wherein a generator for generating a generator voltage is coupled parallel to the vehicle battery and the controller adjusts the generator voltage in normal operation to a first value which is greater than the nominal voltage of the vehicle battery—, the controller may increase the generator voltage in a regeneration operation to a predetermined second value which is greater than the first value. The generator voltage is hence adjusted during regeneration operation to be significantly higher than the nominal voltage of the vehicle battery. In such regeneration operation, the acid layer formed by gas bubble agitation during the service life of the vehicle battery is eliminated and the effective capacity of the vehicle battery is increased. The internal resistance of the vehicle battery also decreases in this regeneration operation. By applying a high voltage to the vehicle battery, the crystal size of the separated lead sulfate can be changed so as to transform from an insoluble form into a soluble form, allowing it to again participate in the charging and discharging processes.

In one embodiment—wherein a generator for generating a generator voltage is coupled in parallel with the vehicle battery and the controller adjusts the generator voltage in normal operation to a first value which is greater than the nominal voltage of the vehicle battery—, the controller may in a recuperation operation increase the generator voltage to a predetermined second value which is greater than the first value. In recuperation operation, the generator voltage is hence adjusted to be greater than the nominal voltage of the vehicle battery. In such regeneration operation, the vehicle battery can be charged, wherein the kinetic energy generated during braking of the automobile or in overrun mode is converted into electrical energy and stored in the vehicle battery. In recuperation operation, the switching means are preferably switched into the second or the fourth switching state, so that the electrical load is either directly connected with the generator or decoupled from the generator. The duration of the recuperation operation is preferably shorter than the duration of the regeneration operation.

When the electrical load is a starter for an internal combustion engine, the energy store can assist the starting process: the controller can control the switching means when the starter is switched on—i.e. at the beginning of the starting process—, such that a lower voltage than the battery voltage is applied on the starter. The controller can attain this, for example, by switching the switching means into the first switching state, where the positive terminal of the energy store is connected with the vehicle battery, or by alternatingly switching the switching means between the first and the second switching state. Accordingly, at the beginning of the starting process, a voltage is applied on the starter which is smaller than the battery voltage. The currents flowing through the starter at the beginning of the starting process then become smaller, thus reducing the load on the vehicle battery.

The voltage applied on the starter may be increased after a predetermined time interval after the beginning of the starting process. When the starter turns, the short-circuit no longer exists. The voltage on the starter can then be increased compared to the beginning of the starting process without loading the vehicle battery. With this approach, the internal combustion engine can be started up significantly faster than with a constant voltage, thereby reducing load on the vehicle battery compared to the state-of-the-art. This also increases the service life of the vehicle battery.

Different curves of the voltage applied on the starter during the starting process can be generated, for example, a linear dependence between $U_B-U_S$ and $U_B+U_S$ may be provided. A logarithmic increase of the voltage on the starter may also be attained, i.e. the voltage may first increase steeply and later approach the value $U_B+U_S$ more slowly. An optimal curve for the voltage on the starter can be adjusted depending on the internal combustion engine.

The switching means may also be used to synchronize the rotation speed of the starter with the rotation speed of the internal combustion engine. This applies in particular to start-stop systems wherein the internal combustion engine is stopped and restarted multiple times during a single trip. Situations exist with start-stop systems wherein the internal combustion engine—for example when stopping at an intersection—transitions into the stop mode while the driver at the same time intends to drive onward. It typically takes quite some time until the internal combustion engine can be restarted; because the slowing-down internal combustion engine must first be brought to a stop before the starter can again engage in a sprocket wheel of the internal combustion engine. According to one embodiment, the rotation speed of the starter may be matched to the rotation speed of the internal combustion engine with the switching means before the internal combustion engine is started—i.e. before the starter engages in the sprocket wheel of the internal combustion engine. Preferably, the controller is configured to adjust the voltage applied on the starter before the starting process begins to a value which is lower than the battery voltage by switching the switching means into the first switching state or by alternatingly switching the switching means between the first and second switching state. The rotation speed of the starter can thus be initially synchronized with the rotation speed of the internal combustion engine. When the starter rotates synchronously with the internal combustion engine, the starter can engage in the sprocket wheel of the internal combustion engine to once more start up the internal combustion engine. Alternatively, the controller may increase the voltage applied on the starter as soon as the starter is operatively connected with the sprocket wheel. For example, the controller may switch the switching means into the third switching stator switch between the second and the third switching state. This approach accelerates the starting process overall, and the driver can start up again immediately after stopping.

If a generator is coupled in parallel with the electrical load, a recuperation operation may be provided with the on-board electrical system. The controller may adjust the generator voltage in normal operation to a first value which is typically greater than the nominal voltage of the vehicle battery, and may adjust the generator voltage in the recuperation operation to a predetermined second value which is greater than the first value. If the switching means are switched in the recuperation operation into the third switching state—wherein the negative terminal of the energy store is coupled with the vehicle battery—, then both the energy store and the vehicle battery can be charged in this situation. For example, in the recuperation operation, the kinetic energy generated during braking of the automobile or in overrun mode can be converted into electrical energy and stored in the energy store as well as in the vehicle battery. Preferably, a propulsion operation wherein the energy store is discharged follows immediately after the recuperation operation. The generator voltage can then be reduced to a minimum, for example to 12 V, thereby potentially saving fuel. A recuperation operation may take place, for example, as follows: the driver accelerates the automobile in fifth gear to a specified speed, for example to 120 kilometers per hour. The driver releases the gas pedal and continues to drive in fifth gear, whereby the vehicle transitions into an overrun mode. In this overrun mode, the automobile is decelerated by the internal combustion engine, so that no fuel is consumed. During this time, the generator voltage is adjusted to 17 V, i.e. to a value higher than the on-board electrical system voltage in normal operation. The controller switches the switching means into the third switching state wherein the positive terminal of the energy store is coupled with a generator (in parallel with the electrical load) and the negative terminal of the energy store is coupled with the vehicle battery. Both the energy store and the vehicle battery are then charged. When the driver operates a gas pedal again, the vehicle once more accelerates. At this time, a transition from the recuperation operation into the propulsion operation occurs wherein the generator voltage is reduced to 12 V, i.e. to a value significantly lower than the voltage of the on-board electrical system of 14.5 V in normal operation. The controller switches the switching means into the first switching state, wherein the positive terminal of the energy store is now coupled with the vehicle battery. The energy store is thereby discharged, so that the voltage on the vehicle battery is higher than the generator voltage of 12 V, for example 14.5 V. Fuel can thus be saved, because the load of the generator on the drive train of the automobile is reduced.

The switching means may include:
- a first switch, in particular a MOSFET, by which the vehicle battery can be coupled with the positive terminal of the energy store,
- a second switch, in particular a MOSFET, by which the electrical load can be coupled with the positive terminal of the energy store,
- a third switch, in particular a MOSFET, by which the vehicle battery can be coupled with the negative terminal of the energy store, and
- a fourth switch, in particular a MOSFET, by which the electrical load can be coupled with the negative terminal of the energy store.

By using MOSFETs, high switching frequencies can be achieved when reversing the polarity of the energy store, which cannot be achieved with conventional relays. Preferably, MOSFETs are used which do not have the parasitic diode. Such MOSFETs have recently become commercially available. By using such MOSFETs, the load can be completely decoupled from the vehicle battery.

The invention also relates to an automobile which has such on-board electrical system.

The method according to the invention is used for operating an electrical load in an on-board electrical system of an automobile. A voltage generation device (for example a vehicle battery or a generator) which provides a supply voltage and an energy store (for example a double-layer capacitor) are provided. With the method, the energy store is coupled for at least a predetermined time interval with the load and the voltage generation unit in such a way that the voltage applied on the load is lower than the supply voltage.

Overvoltages occurring in the on-board electrical system can thereby be compensated by using the energy store.

BRIEF DESCRIPTION OF THE DRAWING

The invention will now be described in more detail with reference to several preferred exemplary embodiments, as well as with reference to the drawing, wherein.

DETAILED DESCRIPTION OF PREFERRED EMBODIMENTS

Figure 1:
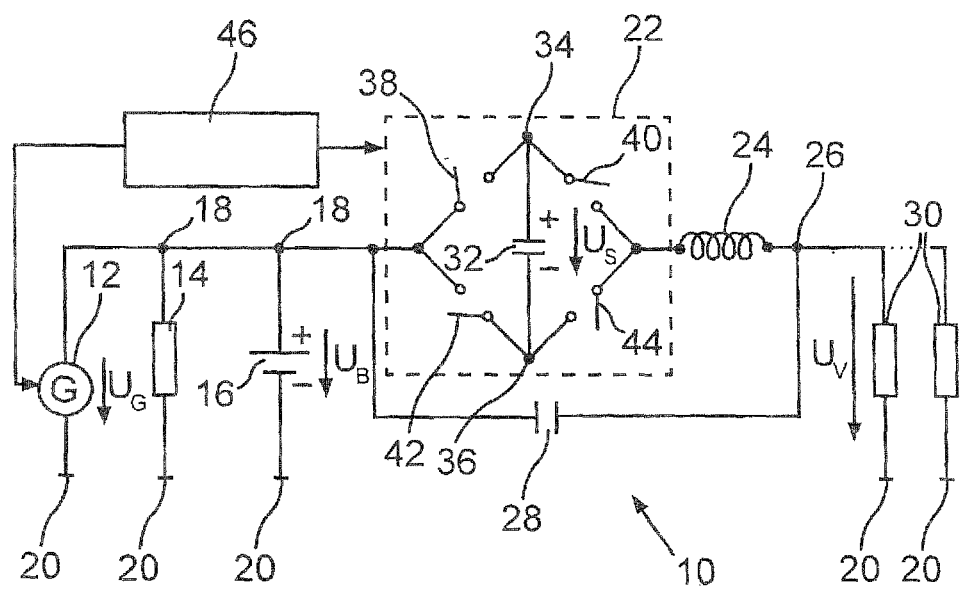
FIG. 1 shows an on-board electrical system of an automobile according to a first embodiment of the invention.

An on-board electrical system 10 illustrated in FIG. 1 includes a generator 12, a high-power load 14 connected in parallel with the generator 12, and a vehicle battery 16 coupled in parallel with the generator 12. The vehicle battery 16 is a hydrocyanic acid battery. The generator 12, the high-power load 14 and the vehicle battery 16 are coupled between a primary pole 18 and a reference potential 20. The vehicle battery 16 has, for example, a nominal voltage of approximately 12 V.

The primary pole 18 is coupled by switching means 22 and a coil 24 with a secondary pole 26. A capacitor 28 is connected in parallel with the series connection of the switching means 22 and the coil 24. The coil 24 and the capacitor 28 form a low-pass filter. The inductance of the coil 24 may be in a range of µH. The capacity of the capacitor 28 is, for example, 10 µF.

A plurality of sensitive electrical loads 30 are coupled between the secondary pole 26 and the reference potential 20. The loads 30 may be, for example, a radio, a headlight, an electric motor for a windshield wiper and the like. An electric voltage applied between the secondary pole 26 and the reference potential 20, i.e. an electrical voltage applied on the loads 30, is referred to as on-board electrical system voltage $U_V$.

A generator voltage $U_G$ is applied on the generator 12 and a battery voltage $U_B$ is applied on the vehicle battery 16. Due to the parallel connection, $U_G=U_B$.

The on-board electrical system 10 includes a double-layer capacitor 32 as an energy store which has a positive terminal 34 and a negative terminal 36. The switching means 22 includes a first, a second, a third and a fourth electrical switch 38, 40, 42, 44. The positive terminal 34 of the double-layer capacitor 32 can be coupled via the first switch 38 with the primary pole 18 and via the second switch 40 and via the coil 24 with the secondary pole 26. Likewise, the negative terminal 36 of the double-layer capacitor 32 can be connected via the third switch 42 with the primary pole 18 and via the fourth switch 44 with the coil 24.

A controller 46 is provided which controls the switching means 22 and also controls the generator voltage $U_G$.

In a first switching state of the switching means 22, the first and the fourth switch 38, 44 are closed, so that the positive terminal of the double-layer capacitor 32 is coupled with the primary pole 18 and hence with the vehicle battery 16. In this first switching state, the negative terminal 36 of the double-layer capacitor 32 is coupled via the coil 24 with the secondary pole 26 and hence with the electrical loads 30.

In a second switching state of the switching means 22, the first and the second switch 38, 40 are closed, i.e. the double-layer capacitor 32 is bridged.

In a third switching state, the second and the third switch 40, 42 are closed: the positive terminal 34 is coupled with the coil 24 and the negative terminal 36 is coupled with the primary pole 18.

In a fourth switching state, all switches 38, 40, 42, 44 or pairwise the first and the third switch 38, 32 and the second and the fourth switch 40, 42, respectively, are open. In this fourth state, the primary pole 18 is disconnected from the secondary pole 26. In the following, possible operating states of the on-board electrical system 10, which are illustrated in FIG. 1, will be described:

Normal Operation:

In normal operation, the generator 12 supplies a voltage of $U_G=14.5$ V. This voltage is slightly higher than the nominal voltage of the vehicle battery 16, so as not to load the vehicle battery 16. The voltage applied on the vehicle battery 16 is therefore $U_B=14.5$ V. In normal operation, the switching means 22 are in the second switching state: the double-layer capacitor 32 is bridged by the switches 38, 40 and/or by the switches 42, 44. This means that the on-board electrical system voltage $U_V$ is equal to the generator voltage $U_G$.

Charging Operation:

In a charging operation, wherein the double-layer capacitor 32 is charged, the generator generates also a voltage of $U_G=14.5$ V. In the charging operation, the switching means 22 are alternatingly switched between the first and the second switching state. The first switch 38 thus remains closed during the charging operation, whereas the second and the fourth switch 40, 44 are alternatingly switched. To adjust the on-board electrical system voltage $U_V$ to about $U_V=U_G$, the time duration during which the second switch 40 is closed is significantly longer than the duration during which the fourth switch 44 is closed. The double-layer capacitor 32 is therefore bridged most of the time.

Overvoltage Compensation with Switched-off Load:

The generator voltage $U_G$ increases when the high-power load 14 is suddenly disconnected. The generator voltage $U_G$ may thereby increase, for example, from 14.5 V to 17 V. The generator 12 is too sluggish to quickly compensate this voltage increase. In this case, the bridge circuit including the switching means 22 and the double-layer 32 offer assistance. When an overvoltage is present between the primary pole 18 and the reference potential 20, the controller 46 switches the switching means 22 from the second switching state, in which the double-layer capacitor 32 is bridged, into the first switching state, in which the positive terminal 34 of the double-layer capacitor 32 is coupled with the primary pole 18. In this case, $U_V=U_G-U_S$. In this situation, the on-board electrical system voltage $U_V$ is controlled to a value of 14.5 V. To adjust the on-board electrical system voltage $U_V$ to this value when using a 5 V double-layer capacitor 32, the switching means 22 may need to be alternatingly switched between the first and second switching state. In this way, an arbitrary average value of the on-board electrical system voltage $U_V$ can be attained. The on-board electrical system voltage $U_V$ is then smoothed with the low-pass filter including the coil 24 and the capacitor 28. As a result, the on-board electrical system voltage $U_V$ can be adjusted to any value in a range from $U_G-U_S$ and $U_G+U_S$.

Undervoltage Compensation when Adding a Load:

When the high-power load 14 is switched on, the generator voltage $U_G$ drops. For example, the generator voltage $U_G$ may drop from 14.5 V to 12 V. The controller 46 then switches the switching means 22 from the second switching state, in which the double-layer capacitor 32 is bridged, into the third switching state, in which the negative terminal 36 of the double-layer capacitor 32 is connected with the primary pole 18. To control the on-board electrical system voltage $U_V$ to 14.5 V, the switching means may need to be alternatingly switched between the second and the third switching state.

Regeneration Operation:

The on-board electrical system 10 can also be used to initiate a regeneration operation for the vehicle battery 16. In this type of operation, the generator voltage $U_G$ is adjusted during a predetermined time interval to a value which is significantly higher than the nominal voltage of the vehicle battery 16. For example, the generator voltage $U_G$ may be adjusted to 17 V. During the regeneration operation, the on-board electrical system voltage $U_V$ may be controlled, for example, to 14.5 V, or the secondary pole 26 may be decoupled from the primary pole 18. By applying a high voltage to the vehicle battery, the effective capacity of the vehicle battery 16 increases and the internal resistance of the vehicle battery 16 decreases.

Figure 2:
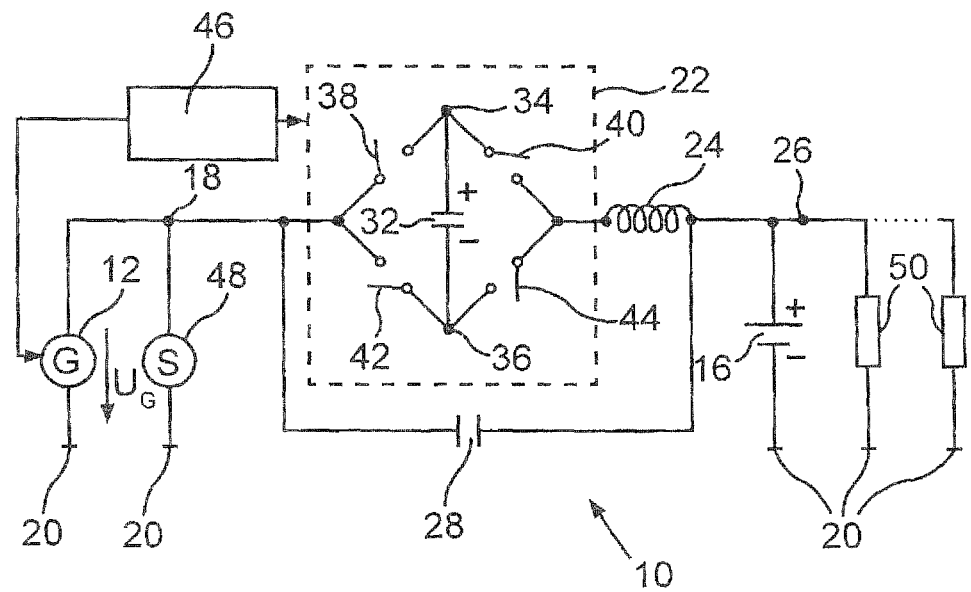
FIG. 2 shows an on-board electrical system of an automobile according to a second embodiment of the invention.

FIG. 2 shows an on-board electrical system 10 according to a second embodiment of the invention. The on-board electrical system 10 according to FIG. 2 corresponds essentially to the on-board system 10 according to FIG. 1, so that in the following only the differences between the two systems will be described. The vehicle battery 16 is here coupled between the secondary pole 26 and the reference potential 20, i.e. in parallel with the electrical loads 30. A starter 48 for starting an internal combustion engine of the automobile as a high-power load is coupled in parallel with the generator 12. The loads coupled with the secondary pole 26 are labeled with the reference character 50.

The on-board electrical system 10 illustrated in FIG. 2 has the following operating states:

Recuperation Operation:

During the recuperation operation, the automobile consumes essentially no fuel. This operation includes, for example, braking with a braking system as well as an overrun mode in which the automobile is braked by the internal combustion engine itself. In this situation, the braking energy is used: the generator voltage $U_G$ is adjusted, for example, to 17 V, i.e. higher than the value of 14.5 V in normal operation. In the recuperation operation, the switching means 22 are switched into a switching state where the positive terminal 36 of the double-layer capacitor 32 is coupled with the primary pole 18 and hence with the generator 12. The negative terminal 36 of the double-layer capacitor 32 is in this recuperation operation coupled with the secondary pole 26 and hence with the vehicle battery 16. Both the double-layer capacitor 32 and the vehicle battery 16 can then be charged. When the double-layer capacitor 32 is fully charged, its polarity can be reversed to enable additional charging of the vehicle battery 16. In the recuperation operation, both the double-layer capacitor 32 and the vehicle battery 16 are charged without consuming fuel.

Propulsion Operation:

The propulsion operation immediately follows the recuperation operation. The energy stored in the double-layer capacitor 32 during the recuperation operation is hereby supplied to the electrical loads 50, so that the generator voltage $U_G$ can be reduced to 12 V. The on-board electrical system voltage $U_V$ is then 14.5 V, even with the reduced generator voltage of $U_G$=12 V. This can save fuel.

Starting Assistance:

When the internal combustion engine is started, the automobile is stopped and the generator 12 does not supply energy. The internal combustion engine must then be started by the starter 48 from the battery voltage $U_B$, which is approximately 12 V when the generator 12 is switched off. At the beginning of the starting process, the positive terminal 34 of the double-layer capacitor 32 is coupled with the vehicle battery 16 and its negative terminal 36 is coupled with the starter 48. The double-layer capacitor 32 is thus charged at the beginning of the starting process, so that a voltage lower than the battery voltage $U_B$ is applied on the starter 48. For example, the voltage applied on the starter 48 at the beginning of the starting process is $U_B$–$U_S$=7 V. This prevents the currents flowing through the initially short-circuited starter 48 from becoming too large, so that the vehicle battery 16 is not overloaded. The polarity of the double-layer capacitor 32 is reversed approximately 50 ms after initiation of the starting process, so that the positive terminal 34 of the double-layer capacitor 32 is coupled with the starter 48 and the negative terminal 36 is coupled with the vehicle battery 16. Accordingly, the voltage on the starter 48 is increased after approximately 50 ms, for example to $U_B$+$U_S$=17 V. With this approach, the time required for starting the internal combustion engine is significantly reduced compared to the state-of-the-art.

In summary, an on-board electrical system 10 is provided wherein several functions can be implemented with little complexity. Both an overvoltage and an undervoltage can be compensated by switching means 22. In addition, the process of starting an internal combustion engine can be assisted.

What is claimed is:

1. An on-board electrical system for an automobile, comprising:
   a generator and a high-power load connected in parallel between a reference potential and a primary pole,
   a vehicle battery connected between the reference potential and the primary pole or between the reference potential and a secondary pole,
   a sensitive electrical load connected between the reference potential and the secondary pole,
   an energy store having a positive and a negative terminal,
   a switching assembly connected between the primary pole and the secondary pole by way of a coil, said switching assembly having a plurality of switches, wherein
   a first switch which when closed connects the primary pole with the positive terminal of the energy store in a first switching state,
   a second switch which when closed connects the sensitive electrical load with the positive terminal of the energy store by way of the coil,
   a third switch which when closed connects the primary pole with the negative terminal of the energy store,
   a fourth switch which when closed connects the sensitive electrical load with the negative terminal of the energy store by way of the coil in the first switching state,
   and
   a controller configured to switch the plurality of switches between the first switching state and at least one of a plurality of additional switching states different from the first switching state, wherein the plurality of additional switching states comprises
   a second switching state wherein the first and the second switch are closed, a third switching state wherein the second and the third switch are closed, and a fourth switching state wherein all switches, or pairwise the first and the third switch and the second and the forth switch, are open.

2. The on-board electrical system of claim 1, wherein in the second switching state the first and the second switch bridge the energy store.

3. The on-board electrical system of claim 2, wherein the controller is configured to alternatingly switch between the first and the second switching state for supplying an electrical voltage to the sensitive electrical load with an average value in a range from $U_B-U_S$ to $U_B$, wherein $U_B$ is a voltage applied on the vehicle battery and $U_s$ is a voltage provided by the energy store.

4. The on-board electrical system of claim 2, wherein the high-power load is a starter for an internal combustion engine, wherein the controller is configured to switch, when the starter is switched on, for a predetermined time interval into the first switching state or to alternatingly switch between the first and the second switching state so as to apply a lower voltage to the starter than a voltage supplied by the vehicle battery.

5. The on-board electrical system of claim 4, wherein the controller is configured to increase a voltage applied to the starter after the predetermined time interval following switch-on of the starter by switching into the third switching state or by alternatingly switching between the second and the third switching state.

6. The on-board electrical system of claim 1, wherein the controller is configured to adjust a generator voltage in standard operation to a first value which is greater than a nominal voltage of the vehicle battery and to adjust the generator voltage in at least one of a regeneration operation and a recuperation operation to a predetermined second value which is greater than the first value.

7. The on-board electrical system of claim 6, wherein the first value is approximately equal to 14.5 V, the nominal voltage of vehicle battery is approximately equal to 12 V, and the predetermined second value is approximately equal to 17 V.

8. The on-board electrical system of claim 1, wherein the controller is configured to alternatingly switch between a second switching state and the third switching state to supply to the sensitive electrical load an electrical voltage with average value in a range from $U_B$ to $U_B+U_S$, wherein $U_B$ is a voltage applied on the vehicle battery and $U_s$ is a voltage provided by the energy store.

9. The on-board electrical system of claim 1, further comprising a capacitor coupled between the primary pole and the secondary pole.

10. The on-board electrical system of claim 1, wherein the controller is configured to control the switching states depending on an instantaneous value of the generator voltage.

11. The on-board electrical system of claim 10, wherein the controller controls a voltage supplied to the sensitive electrical load to a desired value.

12. The on-board electrical system of claim 1, wherein at least one of the first switch, the second switch, the third switch and the fourth switch is a MOSFET.

13. An automobile comprising an on-board electrical system with a generator and a high-power load connected in parallel between a reference potential and a primary pole, a vehicle battery connected between the reference potential and the primary pole or between the reference potential and a secondary pole, a sensitive electrical load connected between the reference potential and the secondary pole, an energy store with a positive and a negative terminal, a switching assembly connected between the primary pole and the secondary pole by way of a coil, said switching assembly having a plurality of switches, wherein a first switch which when closed connects the primary pole with the positive terminal of the energy store in a first switching state, a second switch which when closed connects the sensitive electrical load with the positive terminal of the energy store by way of the coil, a third switch which when closed connects the primary pole with the negative terminal of the energy store, a fourth switch which when closed connects the sensitive electrical load with the negative terminal of the energy store by way of the coil in the first switching state, and a controller configured to switch the plurality of switches between the first switching state and at least one of a plurality of additional switching states different from the first switching state, wherein the plurality of additional switching states comprises a second switching state wherein the first and the second switch are closed, a third switching state wherein the second and the third switch are closed, and a fourth switching state wherein all switches, or pairwise the first and the third switch and the second and the forth switch, are open.

* * * * *